T. F. ROWLAND.

APPARATUS FOR FILLING GAS RETORT CHARGERS.

No. 7,631.

Reissued April 24, 1877.

Witnesses

E. N. Dickerson Jr.

Warren E. Hill

Inventor

Thos. F. Rowland

UNITED STATES PATENT OFFICE

THOMAS F. ROWLAND, OF GREEN POINT, BROOKLYN, NEW YORK.

IMPROVEMENT IN APPARATUS FOR FILLING GAS-RETORT CHARGERS.

Specification forming part of Letters Patent No. 134,399, dated December 31, 1872; reissue No. 7,631, dated April 24, 1877; application filed December 18, 1876.

*To all whom it may concern:*

Be it known that I, THOMAS F. ROWLAND, of Green Point, Brooklyn, Kings county, in the State of New York, have invented certain Improvements relating to Machines for Filling Chargers for Gas-Retorts, of which the following is a specification:

Gas-retorts are ordinarily long horizontal chambers of small uniform section. It has long been common to charge them by introducing the coal in a long vessel, of sufficiently-smaller section to be easily inserted and withdrawn, and discharging the coal therefrom uniformly into the retort, and withdrawing the charger empty. The filling of such chargers by hand involves much time and labor.

The present invention is designed to facilitate this operation, and also to gage or determine an exactly-uniform quantity for each charger.

The following is a description of what I consider the best means of carrying out the invention.

The accompanying drawing forms a part of this specification.

Figure 1:
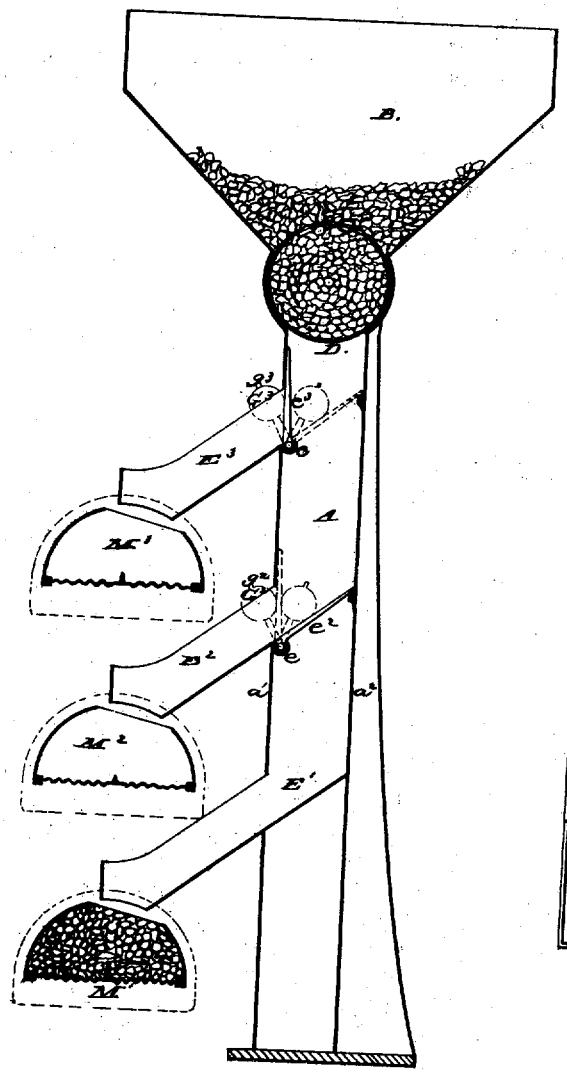
Figure 2:
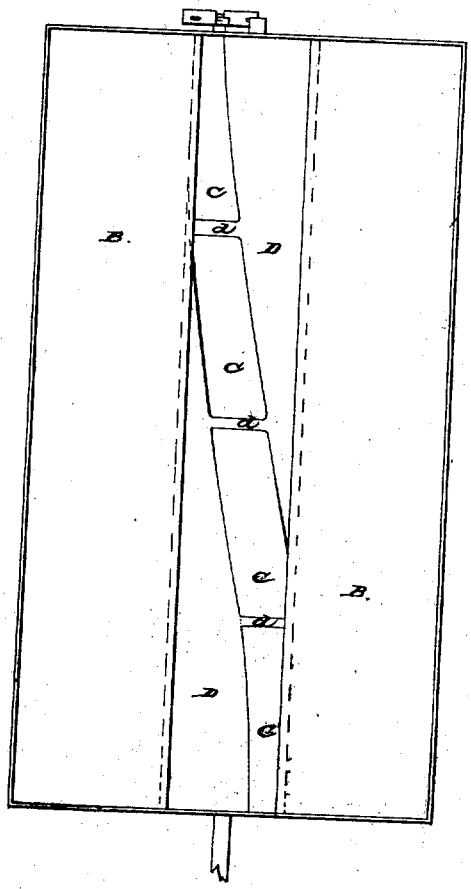

Figure 1 is a vertical section, and Fig. 2 is a plan view.

Similar letters of reference indicate like parts in all the figures.

The chargers here represented are those described in a patent to me dated September 24, 1872, and I consider such preferable; but the invention may be used with success in filling other chargers, as, for example, those of a general cylindrical form, which are emptied by inverting after they are in the retort.

The lowermost charger is marked $M^1$, and those above $M^2$ $M^3$. They are supposed to be carried on a car or movable structure, which will allow their motion both endwise and laterally. The dotted lines surrounding them indicate the sizes of the retorts which they are to fill, and also the proper relations of the chargers to the retorts in the act of filling. The retorts may, however, be far removed from the filling-machine, and the chargers may require to be moved a long distance laterally or endwise, or both, in order to reach the proper point for depositing their charges in their respective retorts.

A may be a fixed construction, having two walls, $a^1$ $a^2$, of cast-iron or other suitable material, with a space between them, through which, in the absence of the valves, to be hereafter described, any objects dropped from the top may fall freely until they strike an inclined plate, $E^1$, which leads it into the lower charger $M^1$. A hopper, B, is provided at the top of the structure A, and into this coal is liberally supplied by hand or by any other suitable means, to be measured off and dropped into the space below, as required. D is a cylindrical vessel, with a liberal opening, C, set a little helically thereon, and bridged across at intervals by narrow braces *d*. The cylinder D *d* is mounted on stout gudgeons, and turned by steam-power or other suitable means, when desired. When the opening C is presented upward, the interior of the cylinder D is filled with coal. When it is revolved so that the opening is presented downward, the coal is dropped into the interior of the structure A, and, in the absence of the valves, falls into the lower charger $M^1$, as has been already indicated. The helical or spiral position of the opening C facilitates the turning of the cylinder D, and softens the concussion which might otherwise result from the sudden depositing of the coal along the whole length at once—that is to say, the resistance due to the necessity for crushing or otherwise disposing of the lumps of coal which chance to be half within and half without the cylinder D is distributed, so that it is not felt along the whole length of the cylinder. So, also, in the emptying of the cylinder D it commences to empty at one end before the other end of the opening is presented downward sufficiently. It is well to rotate the cylinder D moderately; but it will be difficult to rotate it so rapidly that it will not become properly filled when the opening C is presented upward, and entirely emptied when it is presented downward. There is a spout leading from the structure A to each of the chargers $M^2$ and $M^3$, as indicated by $E^2$ $E^3$, and there is a valve corresponding to each, as indicated by $e^2$ $e^3$. These valves are flat, and are mounted in curved plates, which serve as hinges, extending the whole length, as indicated by *e e*.

When the charge has been properly placed in the lower charger $M^1$ the valve $e^2$ is tilted down so as to stand across the structure A and form a continuation of the spout $E^2$, as indicated in strong lines, its previous position having been upright, as indicated in dotted lines. While thus extending across the structure A, the next charge is received. It falls on the valve $e^2$ and is deflected into and through the spout $E^2$ into the middle charger $M^2$. Next, the upper valve $e^3$ is tilted down from the position indicated by the strong lines into that shown by the dotted lines, and now the third charge is received from the cylinder D, and in this condition of machine this charge is deflected and deposited properly in the upper charger $M^3$.

Now, leaving the machine in this condition, the several chargers $M^1$ $M^2$ $M^3$ are taken away, and on the same or another set of chargers being presented to the machine for a second filling operation, the machine may be operated with the several valves conditioned in the reversed order—that is to say, the cylinder D may dump its first load upon the valve $e^3$, so that it shall go into the proper charger $M^3$. Then, that valve $e^3$ being lifted and left in the upright position, its next load will be dumped upon the valve $e^2$ and go into the charger $M^2$, while the third will find both valves $e^3$ $e^2$ in their upright or ineffective conditions, and will fall upon the fixed plate $E^1$ and be led into the lower charger $M^1$. Thus the operations may be continued indefinitely.

The valves $e^2$ $e^3$ may be operated by means of hand-levers fixed on extension, on their shafts or axes. I esteem it important that they shall keep their places where they are left, and, to insure this end, fixed weights, as indicated by $G^2$ $G^3$, are laid on arms $g^2$ $g^3$ arranged as represented, so that the gravity of the weight shall be thrown alternately on one side and the other of the axial line as the valve is moved. Thus, when either valve is thrown into its upright position, the gravity of the weight tends to hold it there, and when it is thrown into its lowest position, extending obliquely across the structure A, the gravity of the weight tends to also hold it firmly there.

The advantage due to some of the features of the invention may be partially or completely realized without the others, but I prefer to use the whole in combination, as shown.

I claim as my invention—

1. The weights $G^2$ $G^3$, fixed, as shown, on arms from the valves $e^2$ $e^3$, and serving relatively to the valve $e^2$ $e^3$, spouts $E^1$ $E^2$ $E^3$, and the gas-retort charges, as herein specified.

2. A cylindrical measure or meter, D, consisting of a revolving barrel or cylinder, having an opening for the reception and discharge of coal and arranged to be revolved completely around its axis, in combination with the hopper B, and one or more guides for measuring and transferring coal into the retort-chargers, substantially as described.

3. A cylindrical measure or meter, D, consisting of a revolving barrel or cylinder, having an opening for the reception and discharge of coal, the said opening being spiral in the surface of the revolving barrel, in combination with the hopper B, and one or more spouts for measuring and transferring coal, substantially as described.

THOS. F. ROWLAND.

Witnesses:
E. N. DICKERSON, Jr.,
WARREN E. HILL.